United States Patent [19]

Imai et al.

[11] 4,291,399
[45] Sep. 22, 1981

[54] INITIAL BLEACH IN AN ELECTROCHROMIC DISPLAY

[75] Inventors: Shigeki Imai, Tenri; Hiroaki Fukuda, Nara, both of Japan

[73] Assignee: Sharp Kabushiki Kaisha, Osaka, Japan

[21] Appl. No.: 52,219

[22] Filed: Jun. 26, 1979

[30] Foreign Application Priority Data

Jun. 28, 1979 [JP] Japan ................... 53/79371

[51] Int. Cl.³ .................. G09F 9/00; G04C 19/00
[52] U.S. Cl. ..................... 368/82; 368/204; 368/239; 340/785
[58] Field of Search ........... 58/23 D, 50 R; 340/756, 340/760, 785, 700 EC; 350/357; 368/82–84, 239–242

[56] References Cited

U.S. PATENT DOCUMENTS 4,074,256  2/1978  Sekiya et al. .................. 340/785
4,150,305  4/1979  Matori et al. .................. 340/785

Primary Examiner—Vit W. Miska
Attorney, Agent, or Firm—Birch, Stewart, Kolasch and Birch

[57] ABSTRACT

An electronic timepiece comprising an electrochromic display device for digital information display. A detection means is provided for developing a detection output when power supply from a power supply source is initiated. The detection output is applied to a driver circuit of the electrochromic display device in order to bleach the entire display segments, thereby ensureing accurate information display.

11 Claims, 5 Drawing Figures

FIG.2 (DRIVE LOGIC -3-)

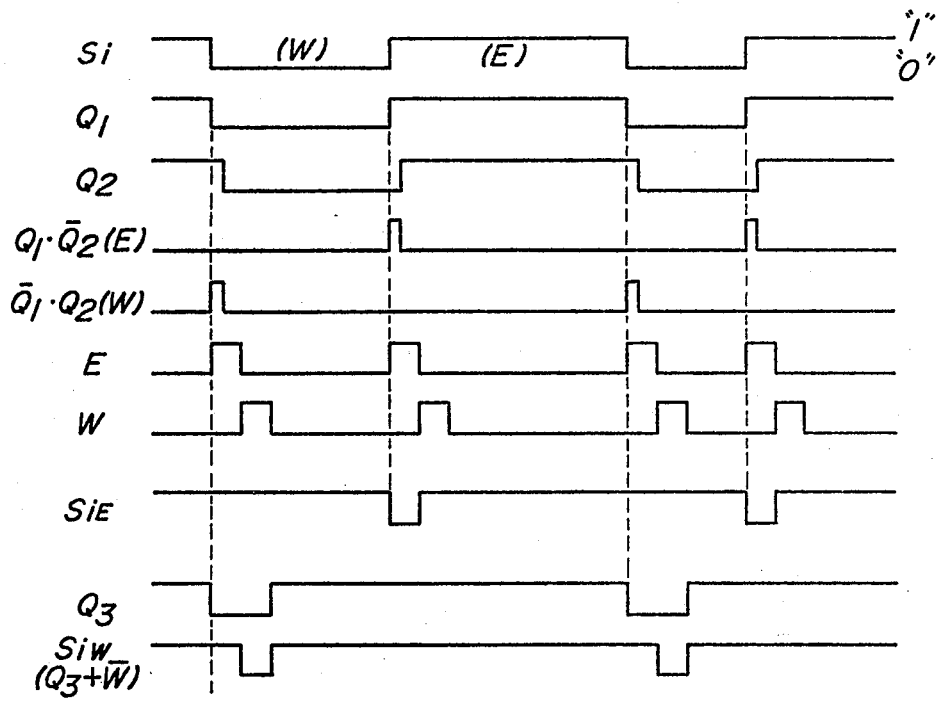
FIG. 3
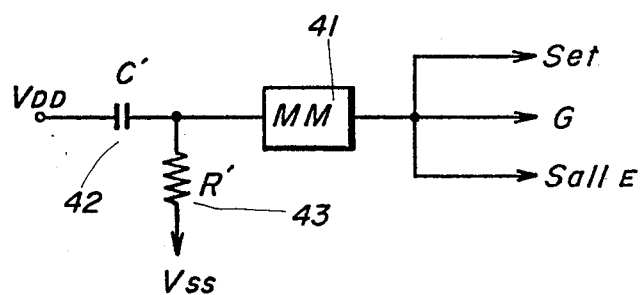
FIG. 4 (PULSE GENERATOR -6-)

4,291,399

INITIAL BLEACH IN AN ELECTROCHROMIC DISPLAY

BACKGROUND AND SUMMARY OF THE INVENTION

The present invention relates to an electrochromic display drive system and, more particularly, to an electrochromic display drive system in an electronic timepiece.

The electrochromic display device inherently possesses a memory effect, wherein the coloration state or the bleached state is maintained for a considerably long period of time after removal of application of the driving signal. Recently, an electronic timepiece has been developed, which employs a digital display device comprising an electrochromic display cell.

In a battery powered electronic timepiece, the information display is held by the electrochromic display cell even when a battery is removed from the electronic timepiece to be exchanged with a new one. Under these conditions, when a new battery is disposed in the electronic timepiece, there is a possibility that the drive logic signal derived from a driver circuit is not correlated with the actual display state of the electrochromic display cell.

More specifically, there is a possibility that a coloration voltage signal is applied to a segment electrode which has been held in the coloration state. This will deteriorate the electrochromic display cell due to the over charge applied to a specific display segment. Moreover, the inconsistency between the drive logic signal and the actual display state precludes an accurate information display and a clean information display.

Accordingly, an object of the present invention is to provide a novel electrochromic display drive system for ensuring an accurate information display.

Another object of the present invention is to provide an electrochromic display drive system suited for a battery powered electronic timepiece.

Still another object of the present invention is to provide a control system for stabilizing an initial condition of an electrochromic display device when a power supply switch is turned on.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a detection means is provided in an electronic timepiece for developing a detection output when a new supply of power is initiated. A driver circuit is constructed so as to bleach all of the segments in the electrochromic display device when the detection output is developed from the detection means.

In a preferred form, the detection output is applied to a drive logic circuit in order to place the drive logic circuit in a standby condition pending the subsequent coloration operation.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 3 is a time chart showing various signals occurring within the drive logic circuit of FIG. 2;

FIG. 4 is a circuit diagram of a detection pulse generation circuit employed in the drive system of FIG. 1.

DESCRIPTION OF THE PREFERRED EMBODIMENTS

Figure 1:
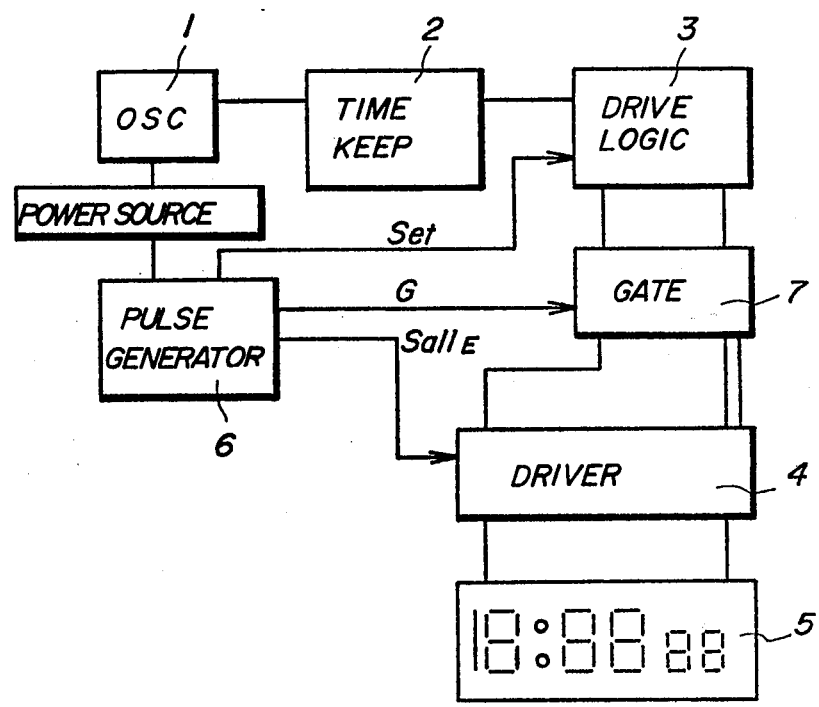
FIG. 1 is a schematic block diagram of an electronic timepiece which employs an embodiment of a drive system for an electrochromic display device of the present invention.

The present drive system will be described in detail with reference to an embodiment shown in the drawings, wherein the present drive system is employed in an electronic timepiece.

FIG. 1 schematically shows an electronic timepiece which employs an electrochromic display device and an embodiment of a drive system of the present invention.

The electronic timepiece mainly comprises a crystal oscillator 1 and a time information keeping circuit 2 as is well known in the art. Current time information stored in the time information keeping circuit 2 is applied to a drive logic circuit 3, which develops a segment selection logic signal. The segment selection logic signal is applied to a driver circuit 4 through a gate circuit 7 in order to display the current time information on an electrochromic display device 5.

Figure 2:
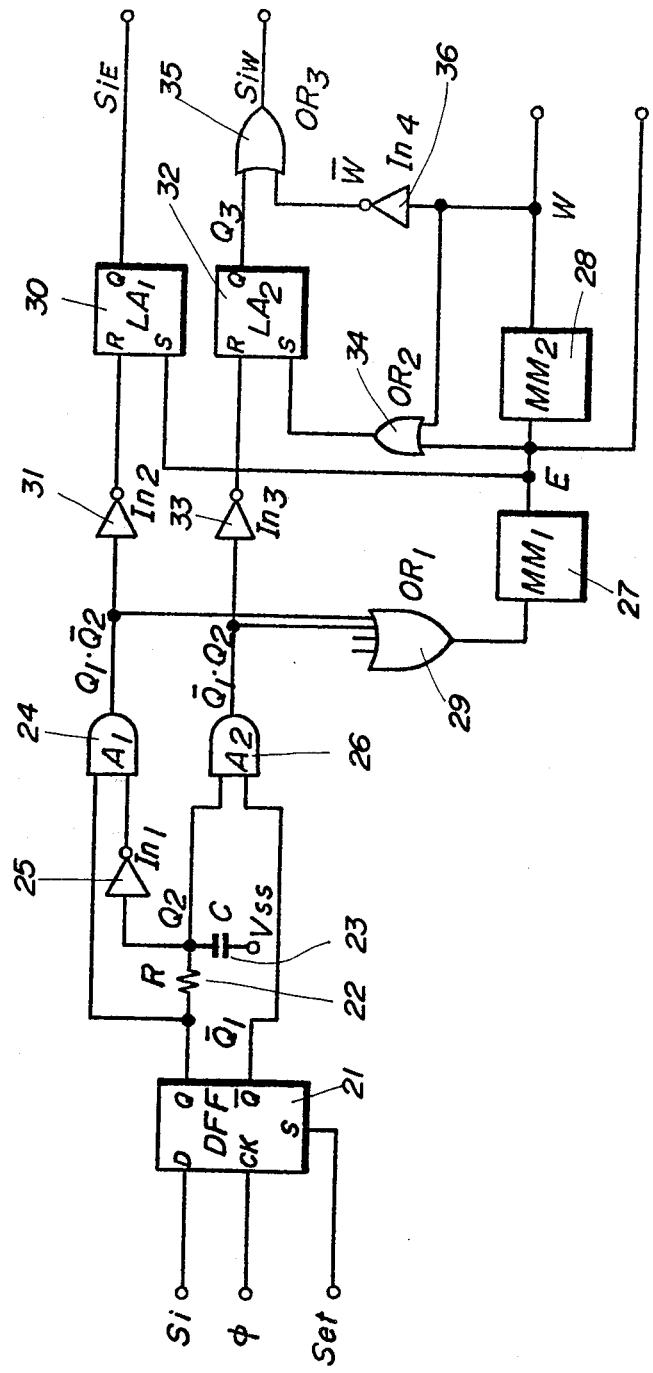
FIG. 2 is a block diagram of a drive logic circuit employed in the drive system of FIG. 1.

FIG. 2 shows a portion of the drive logic circuit 3, which develops the segment selection logic signals in a partial bleach/color drive fashion. FIG. 3 shows various signals occurring within the drive logic circuit 3.

The partial bleach/color drive technique is very effective to minimize the power dissipation. A typical circuit construction to achieve the partial bleach/color drive method is described in copending application, DRIVING TECHNIQUE FOR ELECTROCHROMIC DISPLAYS OF THE SEGMENTED TYPE DRIVING UNCOMMON SEGMENT ELECTRODES ONLY, Ser. No. 871,040, filed Jan. 20, 1978 by Hiroshi Hamada, Hiroshi Take, Yasuhiko Inami, Sadatoshi Tatechi and Hisashi Uede, and assigned to the same assignee as the present application.

FIG. 2 shows the drive logic circuit 3 for a specific one segment, which comprises a D-type flip-flop 21 including an input terminal D for receiving a segment signal "Si". The D-type flip-flop 21 develops output signals at its output terminals Q and $\bar{Q}$ in response to a clock signal "$\phi$" applied to the clock terminal CK. A delay circuit comprising a resistor 22 and a capacitor 23 is connected to the output terminal Q of the flip-flop 21 in order to delay an output signal "$Q_1$" by a predetermined time length.

The thus delayed signal "$Q_2$" is applied to one input terminal of an AND gate 24 through an inverter 25. The other input terminal of the AND gate 24 is connected to receive the output signal "$Q_1$" from the output terminal Q of the flip-flop 21. That is, the AND gate 24 detects the leading edge of the output signal "$Q_1$" ($Q_1.\overline{Q}_2$). The delayed signal "$Q_2$" and an output signal "$\overline{Q}_1$" derived from the output terminal $\overline{Q}$ of the flip-flop 21 are applied to another AND gate 26 in order to detect the trailing edge of the output signal "$Q_1$" ($\overline{Q}_1.Q_2$).

Now assume that the segment signal "$S_i$" represents the coloration state when it takes the logic value "0", and the bleached state when it takes the logic value "1" as shown in FIG. 3. The leading edge of the output signal "$Q_1$" derived from the output terminal Q of the flip-flop 21 represents that the bleaching operation is required. Contrarily, the trailing edge of the output signal "$Q_1$" shows that the coloration operation is required.

The drive logic circuit 3 further comprises monomulti-vibrator 27 and 28. The bleaching operation instruction signal "$Q_1.\overline{Q}_2$" and the coloration operation instruction signal "$\overline{Q}_1.Q_2$" are applied to the monomulti vibrator 27 via an OR gate 29. The monomulti vibrator 27 develops a bleach timing signal "E". The bleach timing signal "E" is applied to the monomulti vibrator 28, which develops a coloration timing signal "W".

The bleaching operation instruction signal "$Q_1.\overline{Q}_2$" is also applied to an input terminal R of a latch circuit 30 through an inverter circuit 31. The other input terminal S of the latch circuit 30 receives the bleach timing signal "E", whereby the latch circuit 30 is placed in the reset state while the bleaching timing signal "E" is applied thereto. The reset output signal is developed from an output terminal Q of the latch circuit 30, which functions as a segment bleach control signal "$S_{iE}$".

The coloration operation instruction signal "$\overline{Q}_1.Q_2$" is also applied to an input terminal R of another latch circuit 32 through an inverter circuit 33. The other input terminal S of the latch circuit 32 receives the bleaching timing signal "E" and the coloration timing signal "W" via an OR gate 34, whereby the latch circuit 32 is placed in the reset state while the bleaching timing signal "E" and the coloration timing signal "W" are applied thereto. The reset output signal "$Q_3$" derived from an output terminal Q of the latch circuit 32 is applied to one input terminal of an OR gate 35. The other input terminal of the OR gate 35 receives the coloration timing signal "W" through an inverter circuit 36. Therefore, the OR gate 35 develops an output signal while the coloration timing signal "W" is developed. The output signal of the OR gate 35 is used as a segment coloration control signal "$S_{iw}$".

The thus developed bleaching timing signal "E", coloration timing signal "W", segment bleach control signal "$S_{iE}$", and segment coloration control signal "$S_{iw}$" are applied to the driver circuit 4 to drive the electrochromic display device 5.

The main feature of the present invention resides in the provision of a detection pulse generation circuit 6, which develops a detection output when power supply is initiated in the electronic timepiece.

FIG. 4 shows an embodiment of the detection pulse generation circuit 6, which mainly comprises a monomulti vibrator 41, and a differentiation circuit including a capacitor 42 and a resistor 43. When a power supply is initiated between power supply terminals $V_{DD}$ and $V_{SS}$ upon, for example, exchange of a battery, the detection pulse generation circuit 6 develops the detection output of a predetermined time length.

The detection output is applied to the driver circuit 4 as an entire segment bleaching control signal "$S_{allE}$" to bleach the entire segments. The detection output is also applied to the gate circuit 7 as a gate control signal "G", whereby the output signal of the drive logic circuit 3 is not applied to the driver circuit 4 while the gate control signal "G" is applied to the gate circuit 7 in order to ensure the completion of the bleaching operation for all of the segments.

Figure 5:
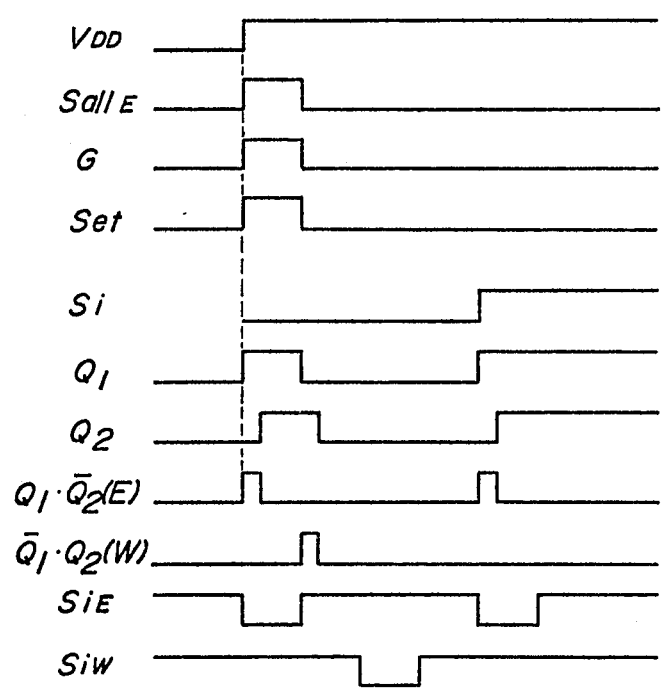
FIG. 5 is a time chart showing various signals occurring within the drive logic circuit of FIG. 2 and the detection pulse generation circuit of FIG. 4.

The detection output is further applied to the drive logic circuit 3 as a set signal "Set" to stabilize the operation of the drive logic circuit 3. More specifically, the set signal "Set" is applied to the set input terminal S of the D-type flip-flop 21 in order to force the output signal "$Q_1$" of the output terminal Q to bear the logic value "1" while the set signal "Set" is developed. Thereafter, when the segment signal "Si" bears the logic value "0", the coloration operation instruction signal "$\overline{Q}_1.Q_2$" is certainly developed. Therefore, the output signal of the drive logic circuit 3 is accurately correlated with the contents of the time information keeping circuit 2. The initial set operation of the drive logic circuit 3 will be more clearly understood from the time chart of FIG. 5.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electrochromic display drive system comprising:

an electrochromic display device having at least two segment electrodes;

driver circuit means for developing a coloration signal and a bleaching signal for coloring and bleaching, respectively, one of said at least two segment electrodes of the electrochromic display device;

selection circuit means for selecting at least one of said segment electrodes for coloring or bleaching by said driver circuit means;

a power supply source for activating said selection circuit means and said driver circuit means; and an initial condition stabilizing means, including
a detection means for developing a detection output when the supply of power from said power supply source is initiated, said detection output energizing said selection circuit means, the operative condition of said selection circuit means remaining fixed in response to said detection output, said detection means including a differentation circuit connected to said power supply source and devloping a differentiated output signal, and
a monomultivibrator for developing said detection output of a predetermined time length in response to said differentiated output signal from said differentiation circuit;
a bleaching signal developing means for bleaching the display on said electrochromic display device in response to said detection output derived from the detection means while the operative condition of said selection circuit means remains fixed.

2. The electrochromic display drive system of claim 1, wherein said electrochromic display device includes a plurality of display segment electrodes, and wherein said bleaching signal developing means bleaches all of said plurality of display segment electrodes of said electrochromic display device.

3. An electronic timepiece comprising:
oscillator circuit means for developing a base frequency signal;
time information keeping circuit means for storing current time information therein in response to said base frequency signal of said oscillator circuit means;
a power supply source for supplying power to said electronic timepiece;
drive logic circuit means for developing a segment coloration control signal and a segment bleach control signal in response to the current time information stored in said time information keeping circuit;
drive circuit means for developing a segment coloration signal and a segment bleach signal in response to said segment coloration control signal and said segment bleach control signal derived from said drive logic circuit;
an electrochromic display device including a plurality of display segments for indicating the current time information in a digital fashion, said display segments being colored or bleached in response to said segment coloration signal or said segment bleach signal, respectively, from said driver circuit means; and
an initial condition stabilizing means including,
a detection means for developing a detection output when the power supply from said power supply source is initiated, said detection output energizing said drive logic circuit means, the operative condition of said drive logic circuit means remaining fixed in response to said detection output, said detection means including a differentation circuit connected to said power supply source and developing a differentiated output signal, and
a monomultivibrator for developing said detection output of a predetermined time length in response to said differentiated output signal from said differentiation circuit;
an entire segment bleach control signal generation means responsive to said detection output for causing said driver circuit means to develop a segment bleach signal to bleach all of the display segments of said electrochromic display in response to said detection output.

4. The electronic timepiece of claim 3, further comprising a gate circuit disposed between said drive logic circuit means and said driver circuit means.

5. The electronic timepiece of claim 4, wherein said detection output energizes said gate circuit for precluding the energization of said driver circuit means by said segment coloration control signal and said segment bleach control signal from said drive logic circuit means.

6. An electrochromic display drive system energized by a power source for driving an electrochromic display device, said display device having at least two segment electrodes and capable of providing a display of a monitored condition by coloring and bleaching said at least two segment electrodes, comprising:
monitoring means for developing a set of monitored output signals indicative of said monitored condition;
segment selection means for selecting at least one of said two segment electrodes for coloring or bleaching in accordance with said monitored output signals and developing segment selection signals in accordance with the selection;
driver means for coloring or bleaching said at least one segment electrode in accordance with said segment selection signals; and
detection means for detecting whether said power source has been removed and for developing at least a first and a second detector output signal when a new power source has been replaced, said first detector output signal energizing said segment selection means and maintaining said segment selection means in a fixed operative condition, said second detection output signal energizing said driver means and causing said driver means to bleach all of said segment electrodes of said electrochromic display device, said detection means including a differentiation circuit means connected to said power source and developing a differentiated output signal, and
monomultivibrator means for developing said first and said second detector output signal of a predetermined time length in response to said differentiated output signal from said differentiation circuit means.

7. An electrochromic display drive system in accordance with claim 6, further comprising:
gate means interposed between said segment selection means and said driver means, said detection means developing a third detector output signal when said new power source has been replaced, said third detector output signal energizing said gate means and preventing said segment selection signals from the segment selection means from energizing said driver means.

8. An electrochromic display drive system in accordance with claim 6 wherein said monitoring means comprises timekeeping means for providing said set of monitored output signals indicative of an updated time information.

9. An electronic timepiece comprising:
oscillator circuit means for developing a base frequency signal;
time information keeping circuit means for storing current time information therein in response to said base frequency signal of said oscillator circuit means;
a power supply source for supplying power to said electronic timepiece;
drive logic circuit means for developing a segment coloration control signal and a segment bleach control signal in response to the current time information stored in said time information keeping circuit;
driver circuit means for developing a segment coloration signal and a segment bleach signal in response to said segment coloration control signal and said segment bleach control signal derived from said drive logic circuit;
an electrochromic display device including a plurality of display segments for indicating the current time information in a digital fashion, said display segments being colored or bleached in response to said segment coloration signal or said segment bleach signal, respectively, from said driver circuit means;

an initial condition stabilizing means including,
- a detection means for developing a detection output when the power supply from said power supply source is initiated, said detection output energizing said drive logic circuit means, the operative condition of said drive logic circuit means remaining fixed in response to said detection output, said detection means including a differentiation circuit connected to said power supply source and developing a differentiated output signal, and
- a monomultivibrator for developing said detection output of a predetermined time length in response to said differentiated output signal from said differentiation circuit; and
- an entire segment bleach control signal generation means responsive to said detection output for causing said driver circuit means to develop a segment bleach signal to bleach all of the display segments of said electrochromic display in response to said detection output; and
- a standby condition setting means for placing said drive logic circuit means in a standby condition suited for the following coloration operation in response to said detection output.

10. An electronic timepiece comprising:

oscillator circuit means for developing a base frequency signal;

time information keeping circuit means for storing current time information therein in response to said base frequency signal of said oscillator circuit means;

a power supply source for supplying power to said electronic timepiece;

drive logic circuit means for developing a segment coloration control signal and a segment bleach control signal in response to the current time information stored in said time information keeping circuit;

driver circuit means for developing a segment coloration signal and a segment bleach signal in response to said segment coloration control signal and said segment bleach control signal derived from said drive logic circuit;

an electrochromic display device including a plurality of display segments for indicating the current time information in a digital fashion, said display segments being colored or bleached in response to said segment coloration signal or said segment bleach signal, respectively, from said driver circuit means;

an initial condition stabilizing means including,
- a detection means for developing a detection output when the power supply from said power supply source is initiated, said detection output energizing said drive logic circuit means, the operative condition of said drive logic circuit means remaining fixed in response to said detection output, said detection means including a differentiation circuit connected to said power supply source and developing a differentiated output signal, and
- a monomultivibrator for developing said detection output of a predetermined time length in response to said differentiated output signal from said differentiation circuit;
- an entire segment bleach control signal generation means responsive to said detection output for causing said driver circuit means to develop a segment bleach signal to bleach all of the display segments of said electrochromic display in response to said detection output;
- gate circuit means disposed between said drive logic circuit means and said driver circuit means; and
- standby condition setting means for placing said drive logic circuit means in a standby condition suited for the following coloration operation in response to said detection output.

11. An electronic timepiece comprising:

oscillator circuit means for developing a base frequency signal;

time information keeping circuit means for storing current time information therein in response to said base frequency signal of said oscillator circuit means;

a power supply source for supplying power to said electronic timepiece;

drive logic circuit means for developing a segment coloration control signal and a segment bleach control signal in response to the current time information stored in said time information keeping circuit;

drive circuit means for developing a segment coloration signal and a segment bleach signal in response to said segment coloration control signal and said segment bleach control signal derived from said drive logic circuit;

an electrochromic display device including a plurality of display segments for indicating the current time information in a digital fashion, said display segments being colored or bleached in response to said segment coloration signal or said segment bleach signal, respectively, from said driver circuit means;

an initial condition stabilizing means including,
- a detection means for developing a detection output when the power supply from said power supply source is initiated, said detection output energizing said drive logic circuit means, the operative condition of said drive logic circuit means remaining fixed in response to said detection output, said detection means including a differentiation circuit connected to said power supply source and developing a differentiated output signal, and
- a monomultivibrator for developing said detection output of a predetermined time length in response to said differentiated output signal from said differentiation circuit;
- an entire segment bleach control signal generation means responsive to said detection output for causing said driver circuit means to develop a segment bleach signal to bleach all of the display segments of said electrochromic display in response to said detection output;
- a gate circuit means disposed between said drive logic circuit means and said driver circuit means; and
- standby condition setting means for placing said drive logic circuit means in a standby condition suited for the following coloration operation in response to said detection output,
- said detection output energizing said gate circuit means for precluding the energization of said driver circuit means by said segment coloration control signal and said segment bleach control signal from said drive logic circuit means.

* * * * *